Patented May 1, 1923.

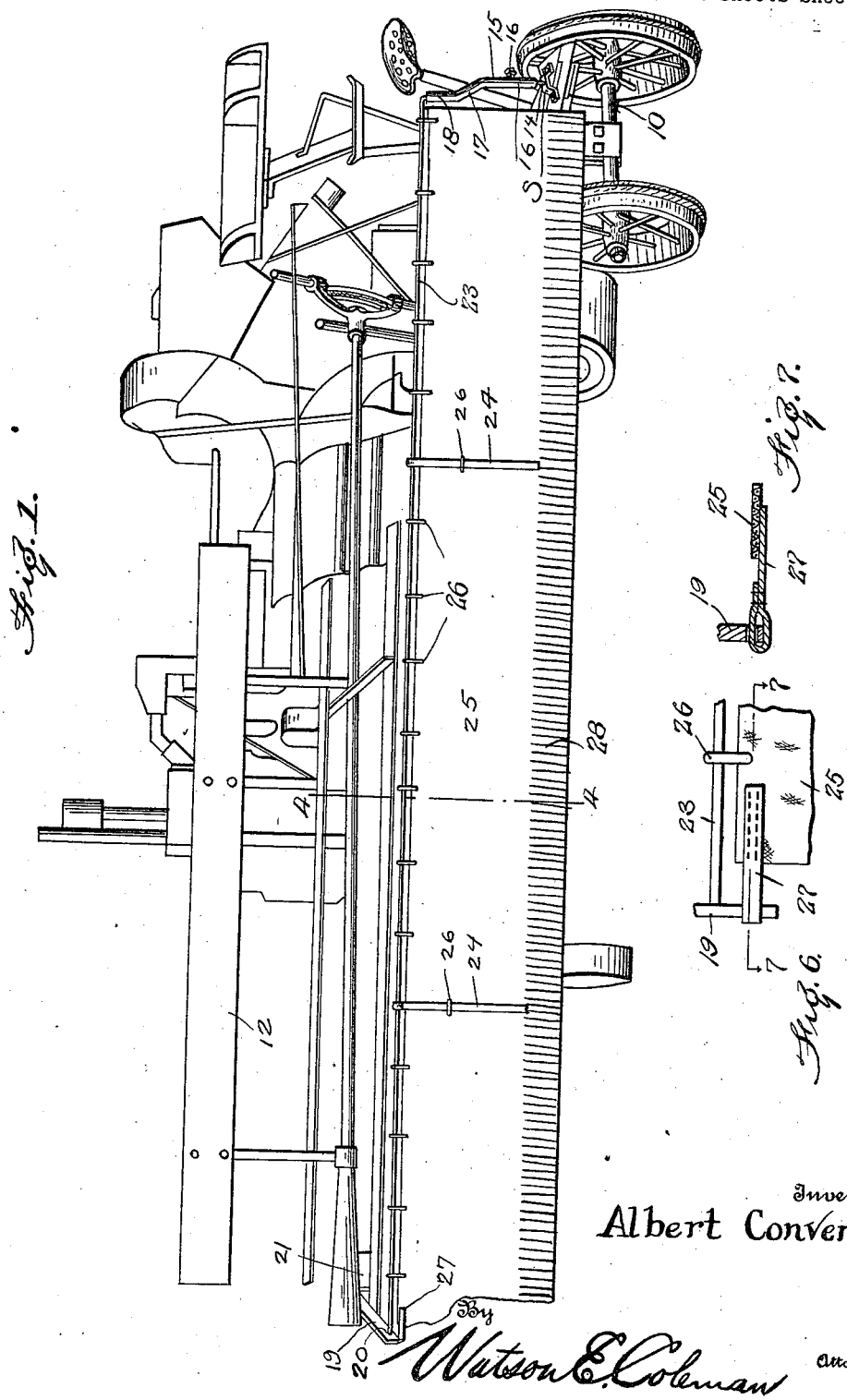

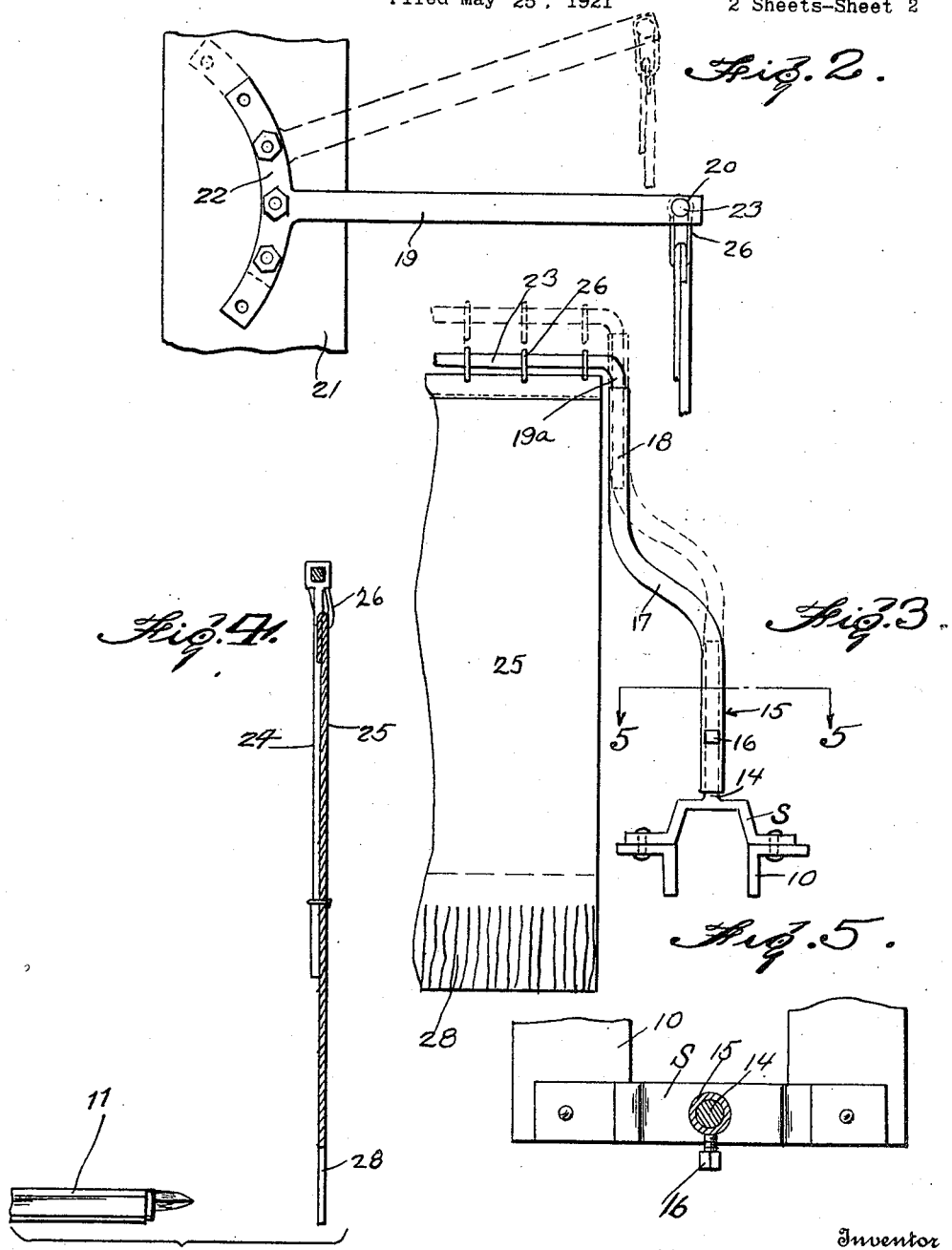

1,453,753

UNITED STATES PATENT OFFICE.

ALBERT CONVERSE, OF PAMPA, TEXAS.

HARVESTER THRASHER.

Application filed May 25, 1921. Serial No. 472,323.

*To all whom it may concern:*

Be it known that I, ALBERT CONVERSE, a citizen of the United States, residing at Pampa, in the county of Gray and State of Texas, have invented certain new and useful Improvements in Harvester Thrashers, of which the following is a specification, reference being had to the accompanying drawings.

This invention relates to improvements in harvester thrashers and has for an important object thereof the provision of a shield to prevent the landing of insects, such as grasshoppers, upon the conveyor apron of the harvester where they would be fed into the threshing mechanism.

A further object of the invention is to provide a device of this character which will engage with the heads of grain prior to their engagement by the sickle of the harvester and cause any insects which might be on the heads to leave the same.

A still further object of the invention is to provide a device of this character which may be readily applied to all standard forms of harvester thrashers and which, when applied, does not interfere in any manner with the normal operation of the thrasher.

Other objects and advantages of the invention will become apparent throughout the course of the following description.

In the accompanying drawings wherein for the purpose of illustration is shown a preferred embodiment of my invention, and wherein like reference characters designate like parts throughout:

Figure 1 is a perspective view of a harvester thrasher combining my invention;

Figure 2 is a fragmentary side elevation showing the mounting of one of the supporting arms;

Figure 3 is a front elevation showing the mounting of the other of the supporting arms;

Figure 4 is a section on the line 4—4 of Figure 1;

Figure 5 is a section on the line 5—5 of Figure 3.

Figure 6 is a detail end view of the curtain and mounting thereof; and

Figure 7 is a section on the line 7—7 of Figure 6.

Referring now more particularly to the drawings, the numeral 10 indicates the truck of a harvester thrasher, and the numeral 11 the harvester platform having operating thereabove the usual rotatable reel 12 for feeding the grain to the sickle 13.

In accordance with my invention I provide a support S which is adapted to be secured to the draft bar carried by the truck or any other suitable portion of the truck. Extending upwardly from the support S is a vertical guide and supporting member 14 upon which is mounted a tubular standard 15. The standard may be secured at any desired height upon the vertical support 14 by means of a set-screw 16. The tubular standard 15 is provided with an offset bend 17 terminating in a vertical extension 18.

As is well known to those familiar with the art, the binder truck is arranged at one side of the harvester thrasher and at the opposite side of the thrasher I secure an arm 19 which extends forwardly from the harvester and is provided with an opening 20 for a purpose presently to appear. The arm 19 may be secured to the mechanism in any desired manner, in the present instance being illustrated as secured to a brace 21, forming an integral portion of the normal structure of the machine. The arm is attached to the brace 21 by means of screws extending through spaced openings formed in an arcuate attaching head 22 formed integrally with the arm 19. The openings of the head are uniformly spaced so that the head may be adjusted and the arm elevated or lowered as may be desired.

The numeral 23 designates a rod having one end thereof directed through the opening 20 of the arm 19 and the other end thereof provided with an angular extension 19$^a$ entering the upper end of the offset portion 18 of the tubular standard. This rod has secured thereto and depending therefrom, arms 24, and a curtain 25 formed of canvas or other suitable material is mounted upon the rod 23 by means of rings 26, and is secured to these arms to be held thereby in extended position. The end of the curtain next adjacent the truck 10 is preferably secured to the rod and the opposite end thereof has secured thereto one end of a spring or elastic 27, the opposite end of which is secured to the arm 19 so that the curtain is longitudinally extended. The lower end of the curtain is provided with a fringe 28 which is adapted to engage against the heads of grain during the travel of the binder and cause any insects which might be resting thereon to leave the heads, the curtain preventing their moving toward the harvester to be mingled with the grain. It will be obvious that the height of the curtain may be readily adjusted by adjusting the arm 19 and by adjusting the tubular standard 15 upon the support 14. It will likewise be obvious that by rotating the tubular standard upon the support 14, this end of the rod may be adjusted toward or away from the sickle and reel, as may be desired.

It will furthermore be obvious that the construction as hereinbefore set forth is capable of some change and modification without departing from the spirit of my invention, and I accordingly do not limit myself to the specific structure thereof except as hereinafter claimed.

What I claim is:

1. The combination with a harvester thrasher, of supports carried by the harvester, and a curtain carried by the supports and having its lower edge disposed at substantially the same height as and in advance of the sickle of the harvester.

2. The combination with a harvester thrasher embodying the usual sickle and reel for feeding grain to the sickle, of a support arranged forwardly of the reel and extending transversely of the harvester thrasher, and a curtain carried by the support and having the lower edge thereof disposed substantially at the same height above the ground as the sickle of the harvester.

3. In combination with a harvester thrasher embodying the usual tongue truck, sickle and reel for feeding grain to the sickle, a support secured to and extending forwardly from the harvester thrasher, a rod having one end mounted in said support, a support for the free end of the rod carried by the tongue truck of the harvester thrasher, arms extending downwardly from the rod, a curtain secured to the rod and to said arms, and means for adjusting said rod toward and away from the sickle and reel.

4. The combination with a harvester thrasher embodying a tongue truck, reel and sickle, of a support extending upwardly from the tongue truck, a second support secured to the harvester thrasher at the opposite side thereof from said tongue truck, a rod mounted in said supports and a curtain carried by said rod.

5. The combination with a harvester thrasher embodying the usual sickle and reel for feeding grain to the sickle, of means carried by the harvester thrasher and extending in advance of the reel and sickle for engaging the grain to thereby cause insects upon the grain to move therefrom.

In testimony whereof I hereunto affix my signature.

ALBERT CONVERSE.